(12) United States Patent
Kim et al.

(10) Patent No.: US 7,731,848 B2
(45) Date of Patent: Jun. 8, 2010

(54) CARTRIDGE MODULE OF HOLLOW FIBER MEMBRANES

(75) Inventors: Jinho Kim, Yongin (KR); Minsoo Park, Seoul (KR); Jiwoong Lee, Yongin (KR); Moonseong Jang, Seoul (KR); Myoung-nam Han, Seoul (KR)

(73) Assignee: KMS Co., Ltd., Yongin-Si (KR)

( * ) Notice: Subject to any disclaimer, the term of this patent is extended or adjusted under 35 U.S.C. 154(b) by 0 days.

(21) Appl. No.: 12/282,670

(22) PCT Filed: Feb. 11, 2008

(86) PCT No.: PCT/KR2008/000793

§ 371 (c)(1),
(2), (4) Date: Sep. 12, 2008

(87) PCT Pub. No.: WO2008/100049

PCT Pub. Date: Aug. 21, 2008

(65) Prior Publication Data

US 2009/0314706 A1     Dec. 24, 2009

(30) Foreign Application Priority Data

Feb. 12, 2007   (KR) ...................... 10-2007-0014593

(51) Int. Cl.
*B01D 63/02* (2006.01)
*B01D 61/00* (2006.01)
(52) U.S. Cl. ............................ 210/321.88; 210/321.87; 210/321.89
(58) Field of Classification Search ........................ None
See application file for complete search history.

(56) References Cited

U.S. PATENT DOCUMENTS 6,325,928 B1   12/2001   Pedersen et al.

FOREIGN PATENT DOCUMENTS

JP          01-269519 A        10/1989

(Continued)

OTHER PUBLICATIONS

Written Opinion of the International Searching Authority for International Application No. PCT/KR2008/000793 dated Apr. 21, 2008.

(Continued)

*Primary Examiner*—Krishnan S Menon
(74) *Attorney, Agent, or Firm*—Edwards Angell Palmer & Dodge LLP; Kongsik Kim; Peter F. Corless (57) ABSTRACT

Disclosed is a cartridge module of hollow fiber membranes, which can be easily mounted on and dismounted from a module mounting frame, and allow a process for removal of the inter-membrane clogging to be performed in an effective and simple manner. The cartridge module is mainly characterized in that a water collecting header has an opened first collected water outlet, which is located at the upper portion of the front surface of the water collecting header and can be opened and closed; and a closed second collected water outlet, which is located at the lower portion of the front surface of the water collecting header and can be opened and closed. The inter-membrane clogging can be very simply removed by dismounting, turning upside down, and remounting the cartridge module.

1 Claim, 4 Drawing Sheets

FOREIGN PATENT DOCUMENTS

| | | |
|---|---|---|
| JP | 06-055040 A | 3/1994 |
| JP | 07-155564 A | 6/1995 |
| JP | 07-178321 A | 7/1995 |
| JP | 11-070324 A | 3/1999 |
| JP | 2006-116495 A | 5/2006 |
| KR | 10-2000-0050208 A | 8/2000 |
| KR | 10-2000-0068327 A | 11/2000 |
| KR | 10-2001-0034351 A | 4/2001 |
| KR | 10-2004-0089599 A | 10/2004 |
| KR | 10-2006-0035887 A | 4/2006 |
| KR | 10-2006-0049347 A | 5/2006 |
| KR | 10-2007-0015129 A | 2/2007 |
| WO | WO-9807506 A1 | 2/1998 |
| WO | WO-0030740 A1 | 6/2000 |
| WO | WO-03066201 A1 | 8/2003 |

OTHER PUBLICATIONS

International Search Report for International Application No. PCT/KR2008/000793 dated Apr. 21, 2008.

CARTRIDGE MODULE OF HOLLOW FIBER MEMBRANES

TECHNICAL FIELD

The present invention relates to a hollow fiber membrane module, more particularly, to a cartridge-type module of hollow fiber membranes, which is suitable for water treatment.

Hollow fiber membranes are broadly used as a separation filter in various fields such as, for example, water treatment fields such as, for instance, aseptic water production, potable water production, advanced treatment in a sewage treatment plant, advanced treatment in a small-scale combined-septic tank, removal of suspended solids from industrial wastewater, water treatment in a wastewater reuse system, treatment of high-concentrated organic wastewater, industrial water treatment, and swimming pool water treatment; material recovery fields in production processes such as, for example, a food industry, an automotive industry, and a steel-making industry; and the like.

BACKGROUND ART

Hollow fiber membranes are generally provided in the form of "module" which can be readily and easily installed to a filtration facility. A hollow fiber membrane module has multiple strands or bundles of hollow fiber membranes, and various manifolds. The manifolds support and fix the multiple strands or bundles of hollow fiber membranes, and collect filtrates which permeate through pores of each hollow fiber membrane.

Such a hollow fiber membrane module is disclosed in, for example, Japanese Patent Application Publication Nos. Hei 7-155564, and Hei 7-178321, and Korean Patent Application Publication No. 2000-0050208. Further, a cartridge module of hollow fiber membranes, which can be easily mounted on a module mounting frame, is disclosed in U.S. Pat. No. 6,325,928 B1.

The important objects to be accomplished in designing a hollow fiber membrane module are "high degree of integration", "easiness of mounting and dismounting", and "easiness of cleaning". The high degree of integration means that the maximized surface area of hollow fiber membranes is provided in a certain volume of module-occupying space. The easiness of mounting and dismounting means that troublesome manual working-efforts required to dismount and mount the hollow fiber membrane module from and on the module mounting frame is minimized. The easiness of cleaning means that a process for removal of the inter-membrane clogging of the hollow fiber membrane module which occurs during the operation of a filtration facility, is easily performed.

In the conventional hollow fiber membrane modules, the high degree of integration, the easiness of mounting and dismounting, and the easiness of cleaning were improved, but there still exists much room for improvement. Particularly, the further improvement in the aspect of the easiness of cleaning is needed.

The inter-membrane clogging phenomenon will be described below in detail. In the case in which the hollow fiber membrane module is submerged into wastewater containing high-concentration suspended solids, the suspended solids are deposited on and between the hollow fiber membranes. Thus, the effective surface area of the hollow fiber membranes which can be used for water permeation is reduced. This phenomenon is called "inter-membrane clogging". As the inter-membrane clogging advances, the quantity of permeated water remarkably decreases, thus, the lifetime of the hollow fiber membrane module being shortened.

In order to relieve the inter-membrane clogging phenomenon, the following method is typically used. The hollow fiber membranes are shaken from the bottom of the hollow fiber membrane module through aeration of air, formation of a turbulent flow, generation of an ultrasonic wave or vibration, or the like during operating the filtration facility, so that the suspended solids deposited on and between the hollow fiber membranes are continuously removed. However, even if such a method is used, the inter-membrane clogging grows up to an unallowable level after the long-term operation.

Due to the recent development of methods for producing hollow fiber membranes, the lifetime-shortening of the hollow fiber membrane itself caused by deterioration of the material constituting the hollow fiber membrane has been much improved. Thus, if the inter-membrane clogging is removed, the hollow fiber membrane module can be reused several times. However, if the process of removing the inter-membrane clogging is very complicated, and takes much time and cost, the reuse of the hollow fiber membrane module is rather ineffective. For example, in order to remove the inter-membrane clogging, the clogged-portion of the hollow fiber membrane was treated by physical methods such as showering, and then, the hollow fiber membrane module was submerged and shaken again. However, such a conventional process took much time, but the removal level was not sufficient to reuse the hollow fiber membrane module.

DISCLOSURE OF INVENTION

Technical Problem

The present invention provides an improved cartridge module of hollow fiber membranes, which can be easily mounted on and dismounted from a module mounting frame, and to which a process for removal of the inter-membrane clogging can be applied in an effective and simple manner.

Technical Solution

The present invention provides a cartridge module of hollow fiber membranes comprising a hollow fiber membrane member and a cartridge frame, wherein:

the hollow fiber membrane member has first and second tubular manifolds which are vertically spaced apart from each other in parallel relation; and a plurality of hollow fiber membranes which make fluid connection between the first and second tubular manifolds, the cartridge frame has a water collecting header; a supporting plate that is spaced apart from and parallel to the water collecting header; and fixing bars that combine the water collecting header and the supporting plate, the water collecting header has a plurality of water collecting inlets which are located side by side in a horizontal direction at the upper and lower portions of the rear surface of the water collecting header; an opened first collected water outlet which is located at the upper portion of the front surface of the water collecting header, and can be opened and closed; and a closed second collected water outlet which is located at the lower portion of the front surface of the water collecting header, and can be opened and closed, a flow channel for collected water, which vertically extends in the interior of the water collecting header, is formed to be in fluid-communication with the water collecting inlets, the first collected water outlet, and the second collected water outlet, the supporting plate has a plurality of fixing recesses which are arranged side by side in a horizontal direction at the upper and lower portions of the front surface of the supporting plate, the opposing ends of each of the fixing bars are attached to sides of the water collecting header and the supporting plate, respectively, and the hollow fiber membrane member is vertically mounted in the interior space of the cartridge module which is defined by the cartridge frame, and the opposing ends of each of the tubular manifolds of the hollow fiber membrane member are coupled to the water collecting inlets of the water collecting header and the fixing recesses of the supporting plate, respectively.

The cartridge module of hollow fiber membranes according to the present invention is mainly characterized in that the water collecting header has the opened first collected water outlet, which is located at the upper portion of the front surface of the water collecting header and can be opened and closed, and the closed second collected water outlet, which is located at the lower portion of the front surface of the water collecting header and can be opened and closed. In the case in which the cartridge module of hollow fiber membranes according to the present invention is applied to a water treatment facility, the collected water which permeates the hollow fiber membranes, is discharged through the first collected water outlet rather than the second collected water outlet. Further, in the case in which air is aerated from the bottom of a stack of hollow fiber membrane modules during operating the water treatment facility, the inter-membrane clogging phenomenon is concentrated on a region which is located directly below the upper manifold (first tubular manifold) of the hollow fiber membrane member, and gradually advances. In the cartridge module of hollow fiber membranes according to the present invention, the inter-membrane clogging can be very easily removed, simply by dismounting the cartridge module from a module mounting frame, turning the cartridge module upside down, and remounting the cartridge module again. More specifically, when the cartridge module is mounted again, the second collected water outlet is opened, and the first collected water outlet is closed. Thereafter, the cartridge module of the present invention is turned upside down, and is remounted on the module mounting frame. Next, the module mounting frame is submerged into an aeration tank for water treatment, again. It is noted that the inter-membrane clogging is located directly above the first tubular manifold which has been moved to the bottom of the cartridge module by turning of the cartridge module upside-down. And, the inter-membrane clogging directly above the first tubular manifold is automatically removed within a range from several hours to several days due to an ascending water current caused by aeration. In this manner, the cartridge module of the present invention can be immediately reused in the water treatment facility, after only a simple remounting process has been performed without a separate cleaning process for removing the inter-membrane clogging. Therefore, the facility shutdown period to remove the inter-membrane clogging for the reuse of the cartridge module, can be significantly reduced. During the reuse, the collected water is discharged through the second collected water outlet.

Advantageous Effects

According to the present invention, the cartridge module of hollow fiber membranes can be easily mounted on and dismounted from the module mounting frame, and allow the process for removal of the inter-membrane clogging to be performed in an effective and simple manner.

BEST MODE FOR CARRYING OUT THE INVENTION

Figure 1:
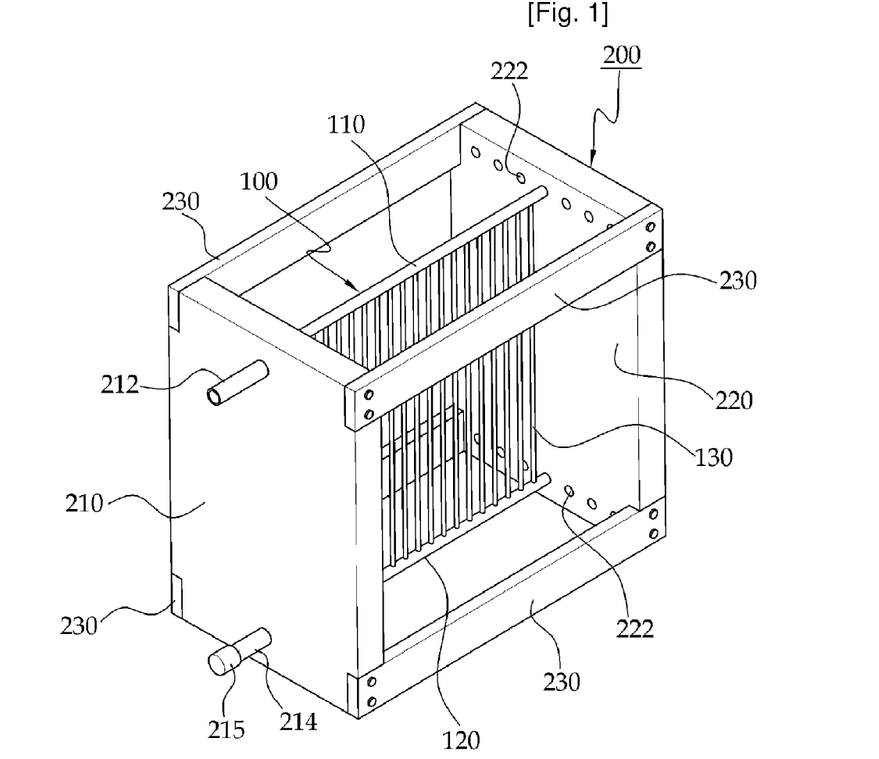
FIG. 1 is a perspective view illustrating a cartridge module of hollow fiber membranes according to a first embodiment of the present invention.

Hereinafter, a cartridge module of hollow fiber membranes of the present invention will be described in greater detail with reference to FIG. 1. FIG. 1 is a perspective view illustrating a cartridge module of hollow fiber membranes according to a first embodiment of the present invention.

The cartridge module according to the first embodiment of FIG. 1 comprises a hollow fiber membrane member 100, and a cartridge frame 200. The hollow fiber membrane member 100 is vertically mounted in an interior space of the cartridge module which is defined by the cartridge frame 200. In FIG. 1, only one hollow fiber membrane member 100 is shown for clarity. In practice, a plurality of hollow fiber membrane members can be mounted in the module interior space defined by the cartridge frame 200.

The hollow fiber membrane member 100 has a first tubular manifold 110, a second tubular manifold 120, and a plurality of hollow fiber membranes 130. The first and second tubular manifolds 110 and 120 are vertically spaced apart from each other in parallel relation. The hollow fiber membranes 130 make fluid connection between the first and second tubular manifolds 110 and 120. Thus, when applied to water treatment, collected water that permeates the hollow fiber membranes 130 is divided in upward and downward directions, and is collected to the first and second tubular manifolds 110 and 120. The opposing ends of each hollow fiber membrane 130 are connected to the first and second tubular manifolds 110 and 120, respectively, so as to be perpendicular to the longitudinal directions of the first and second tubular manifolds 110 and 120. Thus, the hollow fiber membranes 130 are vertically arranged in the module interior space defined by the cartridge frame 200.

The cartridge frame 200 has a water collecting header 210, a supporting plate 220, and fixing bars 230. The water collecting header 210 is spaced apart from and parallel to the supporting plate 220 in a horizontal direction. The fixing bars 230 have a function to spatially fix the water collecting header 210 and the supporting plate 220 such that the water collecting header 210 and the supporting plate 220 maintain a predetermined distance, thus providing the defined module interior space in which the hollow fiber membrane member 100 can be mounted. The water collecting header 210, the supporting plate 220, and the fixing bars 230 form an integrated cartridge frame 200.

The water collecting header 210 has a plurality of water collecting inlets (not shown), a first collected water outlet 212, and a second collected water outlet 214.

The water collecting inlets are located at the upper and lower portions of the rear surface of the water collecting header 210, side by side in a horizontal direction. Since the water collecting inlets are located in the rear of the water collecting header 210, they are not explicitly indicated in the perspective view of FIG. 1. The water collecting inlets are connected with first ends of the tubular manifolds 110 and 120 of the hollow fiber membrane member 100. Thus, the collected water which has passed through the tubular manifolds 110 and 120, is collected to the water collecting header 210 through the water collecting inlets.

The first collected water outlet 212 is located at the upper portion of the front surface of the water collecting header 210. The first collected water outlet 212 is open. Thus, the water which has been collected to the water collecting header 210, is discharged through the first collected water outlet 212 which is located at the upper portion of the front surface of the water collecting header 210. When the cartridge module of the present invention is reused after being turned upside-down in the future, the first collected water outlet 212 should be closed. Therefore, the first collected water outlet 212 is adapted to be able to be opened and closed.

The second collected water outlet 214 is located at the lower portion of the front surface of the water collecting header 210. The second collected water outlet 214 is closed. Thus, the water collected to the water collecting header 210 is not discharged through the second collected water outlet 214 which is located at the lower portion of the front surface of the water collecting header 210. When the cartridge module of the present invention is reused after being turned upside-down, the second collected water outlet 214 should be opened. Thus, the second collected water outlet 214 is adapted to be able to be opened and closed. For example, as illustrated in FIG. 1, the second collected water outlet 214 can be closed and opened by attaching and removing a watertight cap 215. The first collected water outlet 212 can also be opened and closed in this manner. It is understood that the other various opening/closing means can be used.

In the interior of the water collecting header 210, there is provided with a water collecting channel. The water collecting channel extends vertically in the water collecting header 210 so as to be in fluid-communication with the water collecting inlets, the first collected water outlet 212, and the second collected water outlet 214. Thus, the collected water which has passed through the water collecting inlets at the rear upper and lower portions of the water collecting header 210, is collected to the water collecting channel, and then, is discharged through the first collected water outlet 212. Since the water collecting channel communicates with the second collected water outlet 214, the water collected to the water collecting channel can be discharged through the second collected water outlet 214 when the cartridge module of the present invention is reused after being turned upside-down.

The supporting plate 220 is provided with a plurality of fixing recesses 222. The fixing recesses 222 are arranged at the upper and lower portions of the front surface of the supporting plate 220, side by side in a horizontal direction. The second ends of the tubular manifolds 110 and 120 of the hollow fiber membrane member 100 are inserted into and fixed to the fixing recesses 222 (the first ends of the tubular manifolds 110 and 120 of the hollow fiber membrane member 100 are connected with the water collecting inlets of the water collecting header 210). The supporting plate 220 has a function to hold the second ends of the tubular manifolds 110 and 120 of the hollow fiber membrane member 100, so that a water collecting channel is not necessarily formed in the supporting plate 220.

The opposing ends of each fixing bar 230 are attached to sides of the water collecting header 210 and the supporting plate 220. When the cartridge module of the present invention is installed in an aeration tank, the module encounters an ascending water current that vertically passes through the module interior space. If the fixing bars 230 are attached to the top and bottom surfaces of the water collecting header 210 and the supporting plate 220, they obstruct such an ascending water current. Therefore, the fixing bars 230 are preferably attached to the sides of the water collecting header 210 and the supporting plate 220. Although four fixing bars 230 are used in the embodiment of FIG. 1, a cross-sectional shape, width, number, and position of each fixing bar can be variously changed. For example, two fixing bars may be attached to the left-hand and right-hand sides of the water collecting header 210 and the supporting plate 220, respectively. For another example, one wide fixing bar may be attached to the left-hand sides of the water collecting header 210 and the supporting plate 220, while two narrow fixing bars may be attached to the right-hand sides of the water collecting header 210 and the supporting plate 220.

Figure 2:
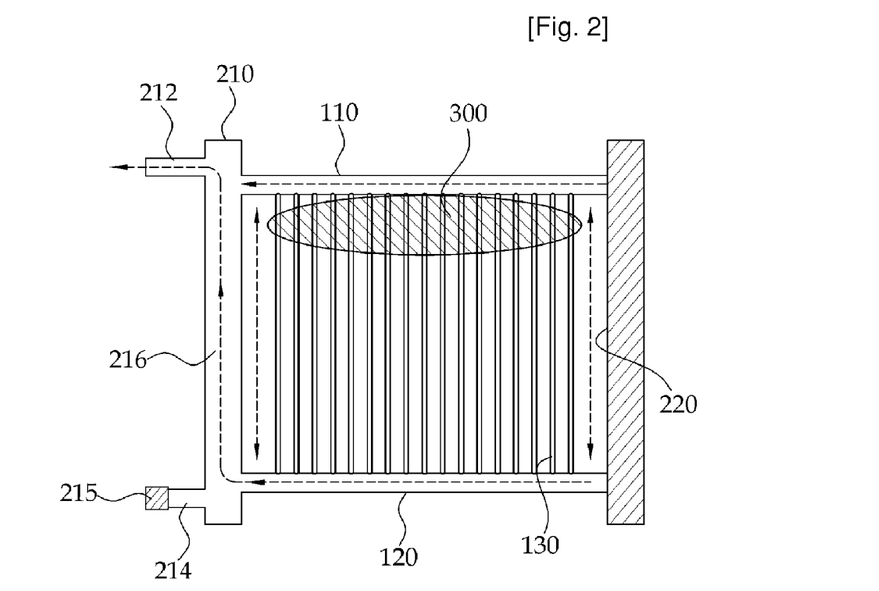
FIG. 2 is a schematic longitudinal cross-sectional view illustrating the cartridge module of FIG. 1.

Now, a water collecting process of the cartridge module of the present invention will be described below in detail with reference to FIG. 2. FIG. 2 is a schematic longitudinal cross-sectional view illustrating the cartridge module of FIG. 1. In FIG. 2, a flow of permeated water is indicated by a dotted arrow.

An upper end of each hollow fiber membrane 130 is coupled to the bottom wall of the first tubular manifold 110 which is located at the top of the cartridge module, and is open to the internal channel of the first tubular manifold 110. A lower end of each hollow fiber membrane 130 is coupled to the top wall of the second tubular manifold 120 which is located at the bottom of the cartridge module, and is open to an internal channel of the second tubular manifold 120. The water which has permeated the hollow fiber membrane 130, is divided in two directions of upward and downward, and then flows into the first and second tubular manifolds 110 and 120.

The left-hand end of the first tubular manifold 110 is coupled to the water collecting inlet located at the rear upper portion of the water collecting header 210, and is open to the water collecting channel 216 in the water collecting header 210. Further, the right-hand end of the first tubular manifold 110 is coupled to the front upper portion of the supporting plate 220. The right-hand end of the first tubular manifold 110 may be opened or closed. However, the supporting plate 220 is provided with no channel for the permeated water, and thus the flow of the permeated water toward the right-hand end of the first tubular manifold 110 is not formed.

The left-hand end of the second tubular manifold 120 is coupled to the water collecting inlet located at the rear lower portion of the water collecting header 210, and is open to the water collecting channel 216 in the water collecting header 210. Further, the right-hand end of the second tubular manifold 120 is coupled to the front lower portion of the supporting plate 220. The right-hand end of the second tubular manifold 120 may be opened or closed. However, the supporting plate 220 is provided with no channel for the permeated water, and thus the flow of the permeated water toward the right-hand end of the second tubular manifold 120 is not formed.

The water collecting channel 216 in the water collecting header 210 communicates with the water collecting inlet located at the rear upper portion of the water collecting header 210, the water collecting inlet located at the rear lower portion of the water collecting header 210, the first collected water outlet 212, and the second collected water outlet 214. The first collected water outlet 212 is opened, but the second collected water outlet 214 is closed by the cap 215.

The permeated water which is introduced into the internal channels of the first and second tubular manifolds 110 and 120, flows into the water collecting channel 216 in the water collecting header 210 through the water collecting inlets on the rear of the water collecting header 210, and then is discharged through the open first collected water outlet 212. Typically, the first collected water outlet 212 is connected to piping (not shown) which is installed on the module mounting frame to be installed in the aeration tank. The permeated water which is discharged through the first collected water outlet 212, can be discharged to the outside of the aeration tank through the piping.

Due to the ascending water current caused by aerationin from the bottom of the aeration tank, the inter-membrane clogging intensively occurs at a clogging zone 300, which is located directly below the first tubular manifold 110 which is located at the upper portion of the cartridge module.

Figure 3:
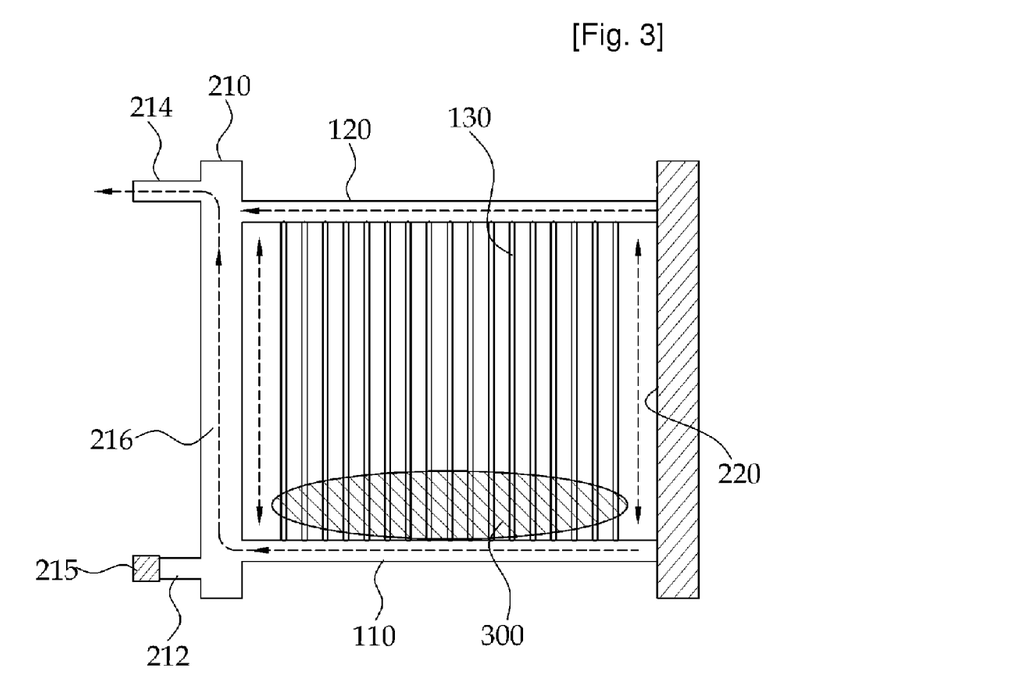
FIG. 3 illustrates the state in which the cartridge module of FIG. 2 is turned upside down.

Hereinafter, a process for removal of the inter-membrane clogging of the cartridge module of the present invention will be described in detail with reference to FIG. 3. FIG. 3 illustrates the state in which the cartridge module of FIG. 2 is turned upside down.

The cartridge module of FIG. 2 is dismounted from the module mounting frame (not shown), and then is turned upside down. Then, the second collected water outlet 214 is opened, and the first collected water outlet 212 is closed by the cap 215. Subsequently, the upside-down cartridge module of FIG. 2 is mounted again on the module mounting frame. As a result, the second collected water outlet 214 is located at the upper portion of the cartridge module, and the first tubular manifold 110 is located at the bottom of the cartridge module. Further, the inter-membrane clogging zone 300 is located directly above the first tubular manifold 110 which is located at the bottom of the cartridge module. Further, the permeated water collected into the water collecting channel 216 is discharged through the second collected water outlet 214.

The upside-down cartridge module of the present invention can be mounted again, and then, directly submerged into the aeration tank without any separate cleaning process. After mounted again, the inter-membrane clogging zone 300 is effectively removed, for instance, within a range from several hours to several days, through an inverse process of the inter-membrane clogging process, by the ascending water current caused by aeration from the bottom of the aeration tank. In other words, while the aeration tank is operated again, the inter-membrane clogging is naturally removed. Eventually, the cartridge module of the present invention can reduce the water treatment facility shutdown period to remove the inter-membrane clogging zone, remarkably.

The second collected water outlet of the cartridge module of the present invention is a component that is not used during the first use of the cartridge module, thus, could not be expected in any conventional cartridge modules, at all. In contrast, due to the second collected water outlet of the cartridge module of the present invention, the cartridge module of the present invention can be turned upside down and mounted again without any separate cleaning process for the inter-membrane clogging, and then, be immediately used again. Without the second collected water outlet, positions of piping connectors of the module mounting frame must be changed whenever the cartridge module of the present invention is turned upside down and mounted again. Thus, the advantage of the cartridge module intended to make mounting and dismounting easy, is severely damaged. However, due to the second collected water outlet, the cartridge module of the present invention can be very simply mounted again after being turned upside down.

If the first collected water outlet is located in the middle of the water collecting header in a vertical direction, the cartridge module can be turned upside down and mounted again, even without the second collected water outlet. However, the inventors of the present invention have discovered that, when the first collected water outlet is located in the middle of the water collecting header in the vertical direction, the water collecting channel in the water collecting header can be very easily air-locked at an upper portion thereof. Thereby, there occurs a serious problem in that the first tubular manifold can not be used for collecting water.

Figure 4:
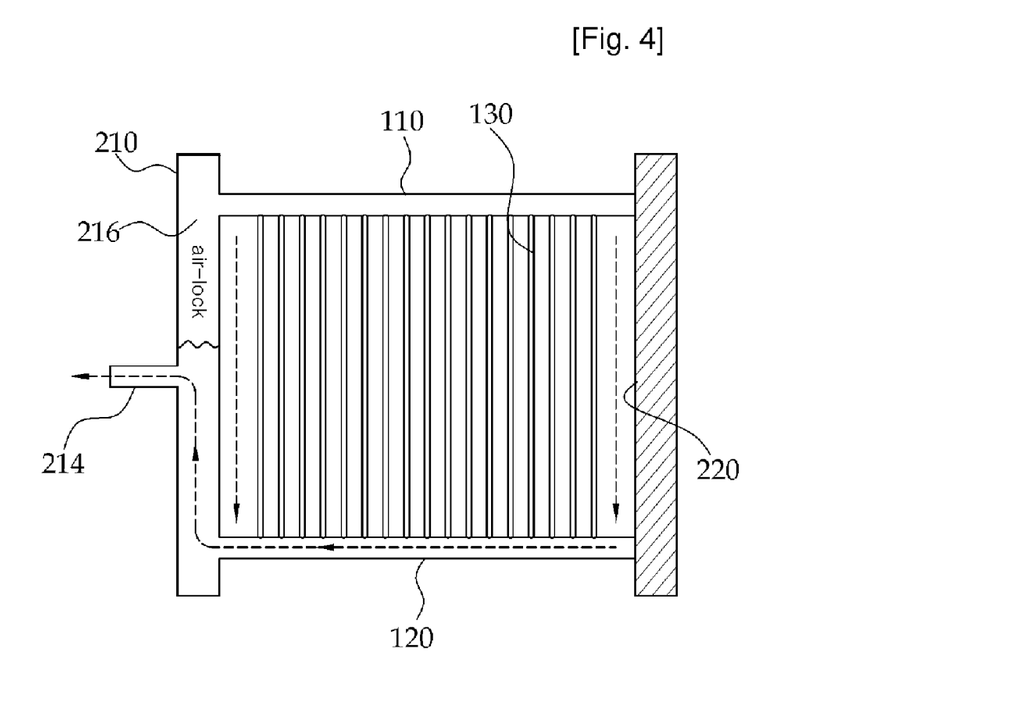
FIG. 4 is a schematic longitudinal cross-sectional view illustrating a cartridge module of a comparative example in which a collected water outlet is located in the middle of a water collecting header in a vertical direction.

Now, the problem of a comparative example in which the collected water outlet is located in the middle of the water collecting header in the vertical direction will be described below in detail with reference to FIG. 4. FIG. 4 is a schematic longitudinal cross-sectional view illustrating the cartridge module of a comparative example in which a collected water outlet is located in the middle of a water collecting header in a vertical direction.

In the cartridge module of FIG. 4 according to the comparative example, one collected water outlet 214 is provided in the middle of the front surface of the water collecting header 210, in the vertical direction. In this case, air, which has been filled in the water collecting channel 216 in the water collecting header 210 before the cartridge module is submerged into the water, is collected and confined in the upper portion of the water collecting channel 216 due to buoyant force. In particular, in a submerged suction type water treatment facility, since the permeated water is drawn out with very low differential pressure, the extent to which the confined air is accompanied with the drawn-out stream of the permeated water, due to a weak drawing force of the drawn-out stream, is very slight. Due to such confined air, the first tubular manifold 110 at the top of the cartridge module fails to provide a channel for the permeated water. The whole quantity of permeated water which has permeated each hollow fiber membrane 130, is introduced into the second tubular manifold 120 at the bottom of the cartridge module. Thus, in the hollow fiber membranes 130, a very great pressure drop between the lower and upper ends of each hollow fiber membrane 130 occurs. As a result, the upper half of each hollow fiber membrane 130 has a very low differential pressure (i.e. negative pressure) for sucking-in water. Thus, a quantity of the permeated water permeated watereduced at the upper half of each hollow fiber membrane 130. Consequently, the filtration efficiency of the entire cartridge module is severely reduced. In other words, the entire surface of each hollow fiber membrane 130 cannot be uniformly used, so that the degree of integration of the cartridge module intended to provide a maximized surface area of hollow fiber membranes in the same volume of module-occupying space, is damaged. In contrast, in the cartridge module of the present invention, since the opened first collected water outlet is located at the upper portion of the water collecting header, the air-lock problem does not occur.

Figure 5:
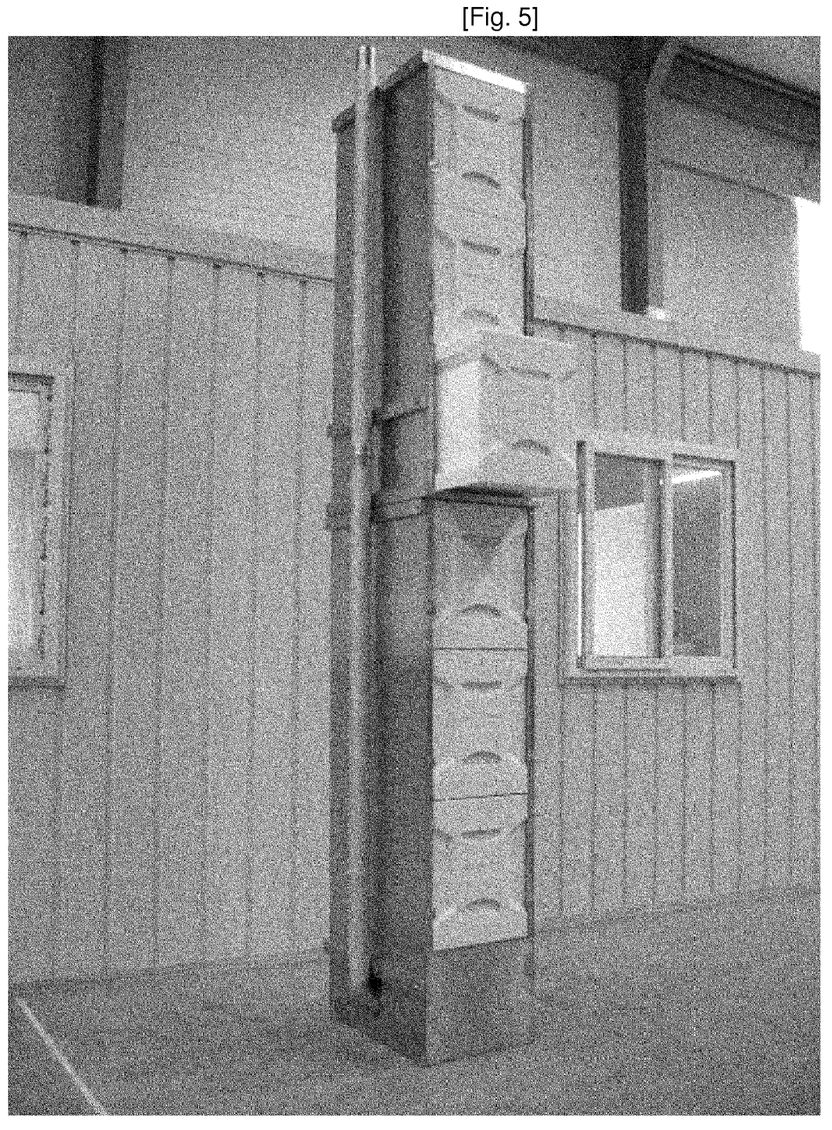
FIG. 5 is a photograph showing the state in which cartridge modules of the present invention are actually mounted on a module mounting frame.
Figure 6:
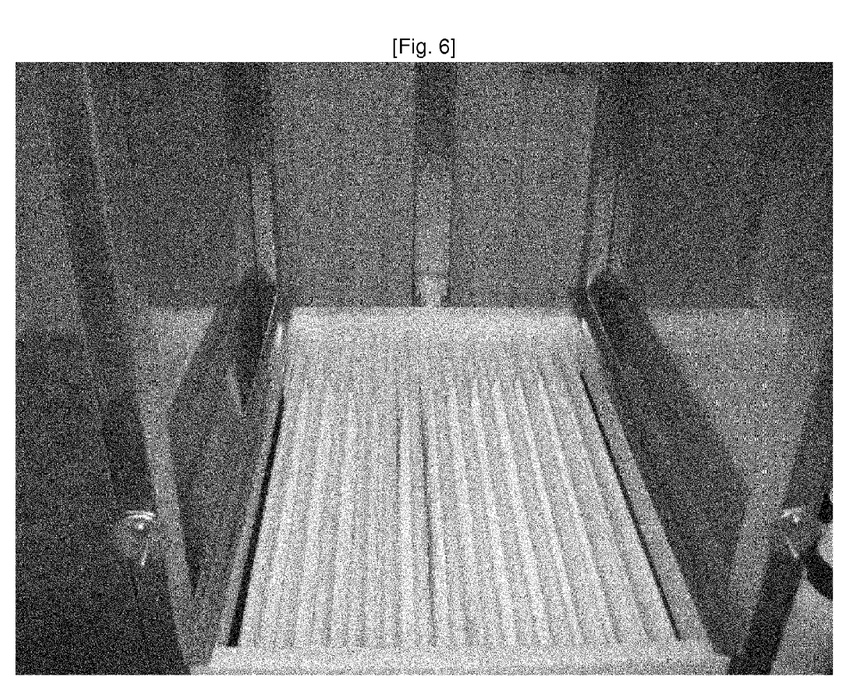
FIG. 6 is a photograph showing more specifically the state in which one cartridge module of the present invention is mounted on a module mounting frame.

FIG. 5 is a photograph showing the state in which cartridge modules of the present invention are actually mounted on a module mounting frame. A total of six cartridge modules of the present invention are inserted into the module mounting frame. FIG. 6 is a photograph showing more specifically the state in which a cartridge module of the present invention is mounted on a module mounting frame. The opened first collected water outlet, which is located at the front upper portion of the water collecting header, is connected to the piping connections in the rear of the module mounting frame. A plurality of hollow fiber membrane members are vertically fixed in the interior space of the cartridge module.

INDUSTRIAL APPLICABILITY

The cartridge module of hollow fiber membranes according to the present invention, can be broadly used as a separation filter in various fields such as, for example, water treatment fields such as, for instance, aseptic water production, potable water production, advanced treatment in a sewage treatment plant, advanced treatment in a small-scale combined-septic tank, removal of suspended solids from industrial wastewater, water treatment in a wastewater reuse system, treatment of high-concentrated organic wastewater, industrial water treatment, and swimming pool water treatment; material recovery fields in production processes such as, for example, a food industry, an automotive industry, and a steel-making industry; and the like.

The invention claimed is:

1. A cartridge module of hollow fiber membranes comprising a hollow fiber membrane member and a cartridge frame, wherein:
   the hollow fiber membrane member has first and second tubular manifolds which are vertically spaced apart from each other in parallel relation; and a plurality of hollow fiber membranes which make fluid connection between the first and second tubular manifolds,
   the cartridge frame has a water collecting header; a supporting plate that is spaced apart from and parallel to the water collecting header; and fixing bars that combine the water collecting header and the supporting plate,
   the water collecting header has a plurality of water collecting inlets which are located side by side in a horizontal direction at the upper and lower portions of the rear surface of the water collecting header; an opened first collected water outlet which is located at the upper portion of the front surface of the water collecting header, and can be opened and closed; and a closed second collected water outlet which is located at the lower portion of the front surface of the water collecting header, and can be opened and closed,
   a flow channel for collected water, which vertically extends in the interior of the water collecting header, is formed to be in fluid-communication with the water collecting inlets, the first collected water outlet, and the second collected water outlet,
   the supporting plate has a plurality of fixing recesses which are arranged side by side in a horizontal direction at the upper and lower portions of the front surface of the supporting plate,
   the opposing ends of each of the fixing bars are attached to sides of the water collecting header and the supporting plate, respectively, and
   the hollow fiber membrane member is vertically mounted in the interior space of the cartridge module which is defined by the cartridge frame, and the opposing ends of each of the tubular manifolds of the hollow fiber membrane member are coupled to the water collecting inlets of the water collecting header and the fixing recesses of the supporting plate, respectively.

* * * * *